(12) United States Patent
Briest

(10) Patent No.: US 12,447,916 B2
(45) Date of Patent: Oct. 21, 2025

(54) MOUNTING FOR A SENSOR ON A VEHICLE STRUCTURE, AND VEHICLE COMPRISING A MOUNTING OF THIS TYPE

(71) Applicant: Volkswagen Aktiengesellschaft, Wolfsburg (DE)

(72) Inventor: Mathias Briest, Debisfelde (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 258 days.

(21) Appl. No.: 17/799,122

(22) PCT Filed: Feb. 10, 2021

(86) PCT No.: PCT/EP2021/053258
§ 371 (c)(1),
(2) Date: Aug. 11, 2022

(87) PCT Pub. No.: WO2021/160704
PCT Pub. Date: Aug. 19, 2021

(65) Prior Publication Data
US 2023/0084105 A1    Mar. 16, 2023

(30) Foreign Application Priority Data
Feb. 11, 2020    (DE) ............... 10 2020 201 712.3

(51) Int. Cl.
*B60R 19/48*    (2006.01)
*G01S 7/02*    (2006.01)
(Continued)

(52) U.S. Cl.
CPC ............ *B60R 19/483* (2013.01); *G01S 7/027* (2021.05); *G01S 13/931* (2013.01); *G01S 17/931* (2020.01);
(Continued)

(58) Field of Classification Search
CPC . B60R 19/483; B60R 2011/008; G01S 7/027; G01S 13/931; G01S 17/931; G01S 2013/93275
See application file for complete search history.

(56) References Cited

U.S. PATENT DOCUMENTS 5,629,690 A    5/1997    Knoll ............................ 340/904
7,455,351 B2    11/2008    Nakayama et al. ....... 296/193.1
(Continued)

FOREIGN PATENT DOCUMENTS

CN    108594392 A    9/2018    ............... G02B 6/44
CN    108674321 A    * 10/2018
(Continued)

OTHER PUBLICATIONS

German Office Action, Application No. 102020201712.3, 8 pages.
(Continued)

*Primary Examiner* — Joseph D. Pape
(74) *Attorney, Agent, or Firm* — Slayden Grubert Beard PLLC

(57) ABSTRACT

The disclosure relates to a mounting for a sensor on a vehicle structure. In some embodiments, the mounting comprises a first sub-assembly that can be fastened to the vehicle structure; a second sub-assembly, to which the sensor can be fastened; and at least one restoring element; wherein the first and second sub-assemblies can move relative to one another and the restoring element is designed to exert restoring forces on the second sub-assembly in accordance with the relative movement, in order to force the second sub-assembly into an initial position.

18 Claims, 8 Drawing Sheets

(51) Int. Cl.
*G01S 13/931* (2020.01)
*G01S 17/931* (2020.01)
*B60R 11/00* (2006.01)

(52) U.S. Cl.
CPC .................. *B60R 2011/008* (2013.01); *G01S 2013/93275* (2020.01)

(56) References Cited

U.S. PATENT DOCUMENTS

| | | | | |
|---|---|---|---|---|
| 7,784,855 | B2 * | 8/2010 | Faass | G01D 11/30 |
| | | | | 340/436 |
| 8,480,142 | B2 | 7/2013 | Wuerfel | 293/117 |
| 10,124,706 | B2 * | 11/2018 | Zimmermann | A47B 88/487 |
| 11,285,897 | B2 | 3/2022 | Schulz | |
| 11,292,410 | B2 * | 4/2022 | Keysberg | G01S 13/931 |
| 2002/0125383 | A1 * | 9/2002 | Takahashi | B60R 19/483 |
| | | | | 180/274 |
| 2019/0198986 | A1 | 6/2019 | Singh | |
| 2020/0208947 | A1 * | 7/2020 | DeCosta | F41J 1/10 |
| 2020/0317130 | A1 | 10/2020 | Miethig | |
| 2022/0227307 | A1 * | 7/2022 | Shout | B60R 21/045 |

FOREIGN PATENT DOCUMENTS

| | | | | | |
|---|---|---|---|---|---|
| CN | 115489440 | A | * | 12/2022 | |
| DE | 4410895 | A1 | | 10/1995 | ............. B60R 19/48 |
| DE | 10316535 | B3 | | 1/2005 | ............. B60R 19/48 |
| DE | 10336358 | A1 | | 3/2005 | ............. B60R 19/48 |
| DE | 102005032082 | B3 | * | 12/2006 | ........... B60R 19/483 |
| DE | 102005037151 | A1 | | 2/2007 | ............. B60R 19/18 |
| DE | 102007045001 | A1 | | 4/2009 | ............. B60R 19/18 |
| DE | 102009018792 | A1 | | 11/2009 | ............. B60R 11/00 |
| DE | 102011000501 | A1 | | 8/2012 | ............. B60K 11/08 |
| DE | 102016122646 | A1 | * | 5/2018 | ......... G02B 27/0149 |
| DE | 102017001081 | A1 | | 8/2018 | ............. B60R 19/24 |
| DE | 102017006273 | A1 | | 1/2019 | ............... B60R 1/00 |
| DE | 102017009055 | A1 | | 3/2019 | ............... B60R 1/00 |
| DE | 102017009057 | A1 | | 3/2019 | ............... B60R 1/00 |
| DE | 102018205849 | B3 | | 6/2019 | ............... B60R 1/00 |
| DE | 102018210094 | A1 | * | 12/2019 | |
| DE | 102019210776 | A1 | | 1/2021 | ............. B60R 19/48 |
| DE | 102020201712 | A1 | | 8/2021 | ............. B60R 19/48 |
| WO | 2021/160704 | A1 | | 8/2021 | ............. B60R 11/00 |

OTHER PUBLICATIONS

International Search Report and Written Opinion, Application No. PCT/EP2021/053258, 6 pages.
Chinese Office Action, Application No. 202180013980.7, 13 pages, Jan. 22, 2025.

* cited by examiner

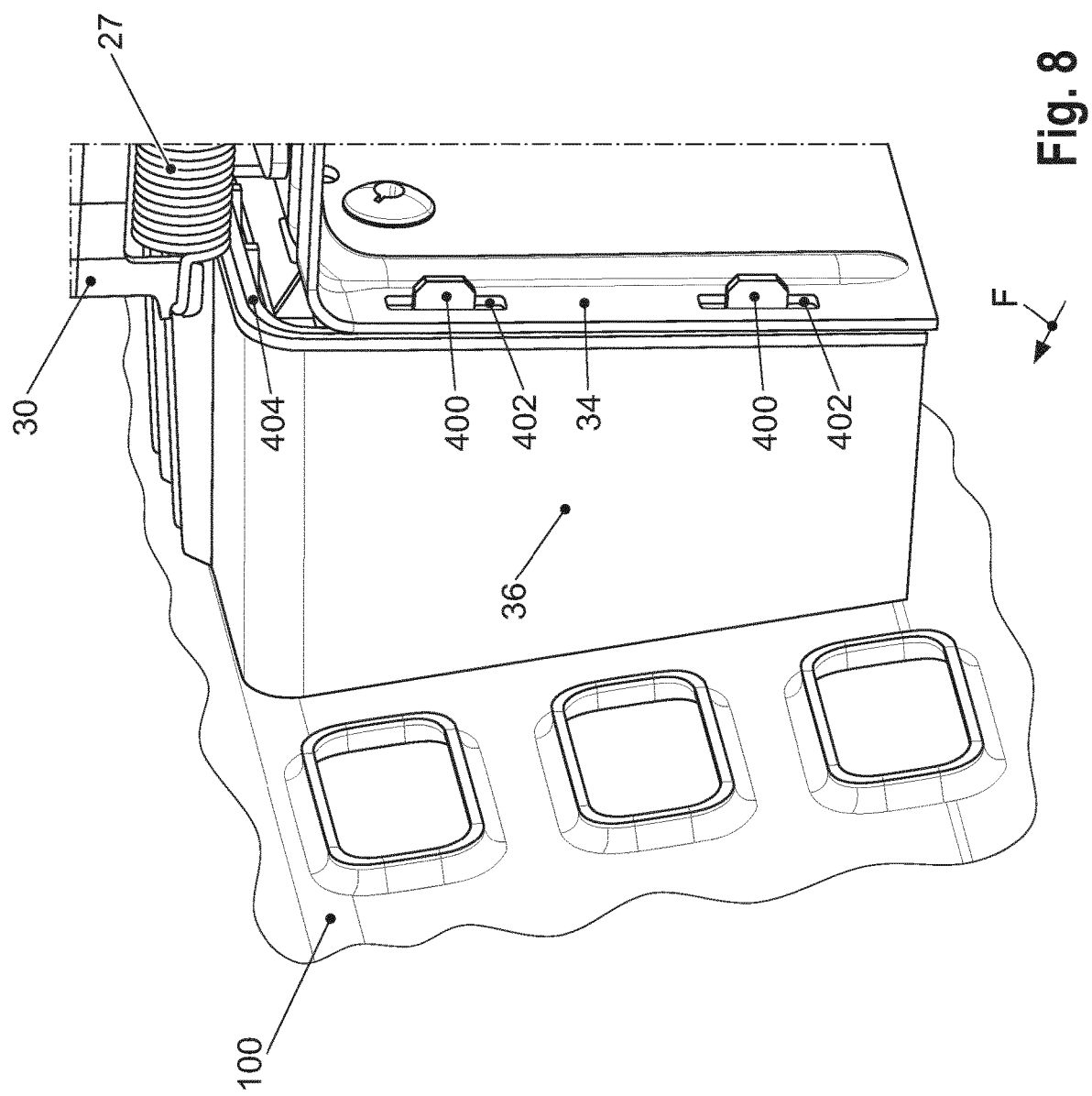

MOUNTING FOR A SENSOR ON A VEHICLE STRUCTURE, AND VEHICLE COMPRISING A MOUNTING OF THIS TYPE

CROSS-REFERENCE TO RELATED APPLICATIONS

This application claims priority to German Patent Application No. DE 10 2020 201 712.3, filed on Feb. 11, 2020 with the German Patent and Trademark Office. The contents of the aforesaid patent application are incorporated herein for all purposes.

TECHNICAL FIELD

The invention relates to a mounting for a sensor on a vehicle structure and to a vehicle comprising a mounting of this type.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Sensors are used on vehicles for a wide variety of purposes. In particular, they may be provided for detecting the surroundings and, for example, for recording information on the surroundings and, in particular, information relating to the distance between the vehicle and surrounding objects. One example of sensors of this type are radar sensors and, more specifically, mid-range radar sensors, such as those used in passenger cars or trucks. They may, for example, be configured to detect the surroundings lying ahead in a forward direction of travel, in particular in order to establish a proximity to obstacles or general objects located in said surroundings. For example, sensors of this type may be used to activate safety-related driver assistance systems such as emergency brake assistants.

In particular, sensors for detecting the surroundings are typically intended to be positioned as close as possible to an outer contour or rather in the region of the outer shell of a vehicle. However, there, they are susceptible to collision forces acting from outside and/or constitute components that are relevant in the event of a collision. For example, they can act as interfering contours in the event of a collision with a pedestrian and may potentially endanger their health.

With regard to the latter aspect, there are solutions for mounting a sensor via deformation elements or the like, which yield in the event of a collision and can absorb additional energy and/or can reduce an effective interfering contour of the sensor due to the corresponding deformation movement and thus evasive movement.

The disadvantage of this is that the sensors are no longer fully functional in the event of deformation of their mountings and/or associated deformation elements. For example, their position in the vehicle may be permanently changed, and therefore signals detected by them can no longer be evaluated in a meaningful way. In particular, the detection field or a position calibrated by means of calibration and/or a coordinate system of the sensor may be changed relative to the vehicle on account of the corresponding permanent change of position, without evaluation software being able to recognize and/or compensate for this. The sensors must then be exchanged and/or recalibrated at great expense.

SUMMARY

A need exists to improve the attaching of sensors on or, alternatively, in a vehicle structure, in particular with regard to collisions.

The need is addressed with the subject matter of the appended independent claims. Embodiments are given in the dependent claims, the following description, and the drawings. It should be understood that all of the explanations and features provided in the preceding may also be provided in the present solution or may apply thereto, unless otherwise indicated.

BRIEF DESCRIPTION OF THE DRAWINGS

FIG. 8 is a partial view of a sensor mounting according to an alternative embodiment.

DESCRIPTION

Figure 1:
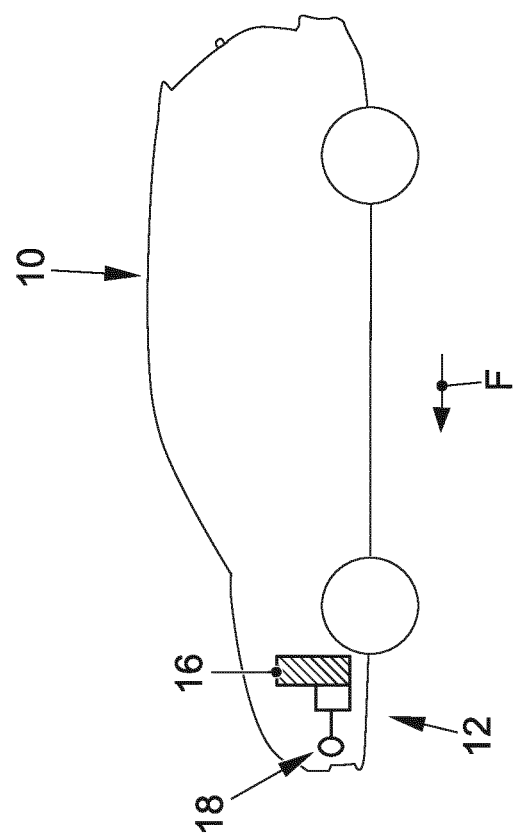
FIG. 1 is a schematic overview of a vehicle comprising a sensor mounting according to a first embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

It was found that current solutions with deformable structures do not always allow for sufficiently rigid attachment of the sensor to the vehicle structure and/or only allow for evasive movements that are difficult to predict in the event of a collision. The latter case may mean that, in spite of corresponding evasive movements, there is still the risk of injury to collision partners. In this case, too, the risk of a position of the sensor within the vehicle structure being permanently altered such that the subsequently recorded sensor signals can no longer be evaluated in a meaningful way is increased.

Therefore, a mounting is proposed for a sensor on a vehicle structure by means of which defined evasive movements and, in particular, substantially linear movements (for example along only one defined axis of movement) of the sensor are made possible. In this way, the sensor can retreat in a defined manner, which reduces the risk of injury. In some embodiments, the sensor can be used as before for further operation in spite of its temporarily altered position or if the original position or installation location can at least be restored with little effort. A defined retreating is beneficial in each of these cases as well.

In particular, it is proposed to provide a restoring element that can preload the sensor into an initial position or, alternatively, can force the sensor into said initial position. For example, the sensor may retreat in the event of a collision, but in the process may compress the restoring element and, as a result (e.g., after the forces acting from outside have relented), be moved back into the initial position. In this way, a sufficient evasive movement and thus a reduction of the risk of injury in the event of a collision is made possible, and, at the same time, the probability that the sensor can be operated again afterwards is increased, since it retains its position in the vehicle (initial position).

The initial position may for example be an operating position (or measuring position) and/or a general position of the sensor in the collision-free vehicle. In particular, the sensor may be calibrated in relation to the initial position. The calibration can make it possible to transform measured values of the sensor (in particular measured distance values) into a desired coordinate system, e.g., into a parent vehicle coordinate system, with a high degree of accuracy when the initial position is assumed.

Alternatively or additionally, the initial position may be a position in which the restoring element generates comparatively small, minimal or no restoring forces. However, as will be explained below, the restoring forces may be generated at the latest upon deflection of the sensor out of the initial position and may then increase in proportion to the deflection.

Alternatively or additionally, in the initial position, the sensor may be positioned as far forward as possible and/or as close as possible to an outer face of the vehicle or to the surroundings when viewed along an axis of movement that will be explained below. In other words, the sensor may have been deflected to a maximum extent along the axis of movement in an outward direction.

The sensor may be displaced from the initial position under the influence of external forces, in particular counter to a direction of travel and/or further inwards into the vehicle. This may take place until a (maximum) retreat position has been assumed, in which the sensor has retreated as far as possible with respect to the initial position. In this retreat position, the sensor (and components that can move together therewith, for example the second sub-assembly mentioned below) can be protected against further external influences.

The restoring forces may be of such a magnitude that the sensor can provide corresponding evasive and restoring movements even in the event of low-speed crashes of the like simulated with the so-called pendulum test according to ECE R42, for example. In the above-mentioned pendulum test, large masses are moved against the front of the vehicle at speeds of few km/h in order to simulate collisions during parking procedures or the like, for example.

It is also beneficial that the sensor may initially be positioned relatively close to an outer shell of the vehicle. This is particularly beneficial in the case of sensors for detecting the environment but is sometimes also desirable for design reasons. For example, in the case of radar sensors, a position close to or in the region of the outer shell of a vehicle may be associated with providing openings in the outer shell that are smaller than if the sensor were positioned further inside. Front positioning of this kind is made possible, since a sufficient range of motion is provided for the sensor in the event of a crash on account of the defined displaceability and/or restoring possibility.

In particular, a mounting is proposed for a sensor on a vehicle structure or, in other words, for holding a sensor on a vehicle structure, comprising:
  a first sub-assembly (or sub-mounting), which can be fastened to the vehicle structure;
  a second sub-assembly (or sub-mounting), to which the sensor can be fastened;
  at least one restoring element;
  wherein the first and second sub-assemblies can move relative to one another, and the restoring element is designed to exert restoring forces on the second sub-assembly in accordance with the relative movement, in order to force the second sub-assembly into an initial position.

The first and second sub-assemblies may in each case be formed in one piece or multiple pieces. In particular, at least one of the first and second sub-assemblies may be a multi-piece module, wherein the individual components of said module may for example be fastened to one another and/or cannot move relative to one another. The first and/or second sub-assembly may be manufactured at least in part from a plastics material. In contrast, the vehicle structure may for example be made of metal. In particular, the vehicle structure may be a bumper crossmember and/or generally a structure positioned near to the front of the vehicle.

The mounting may generally be attached to the vehicle structure in such a way that the sensor can be held or mounted in a position further forward with respect to the vehicle structure when viewed in a (forward) direction of travel. Alternatively or additionally, the mounting may be designed to position the sensor close to or rather immediately behind or at a distance of less than 20 cm behind an outer component and/or an outer shell of the vehicle. This may, for example, be a component of the outer bodywork and/or a cladding component, for example a radiator grille (ventilation grille) or a bumper.

The sensor may be a radar sensor, in particular an above-mentioned mid-range radar sensor. However, it may also be another sensor, in particular for detecting the environment of the vehicle.

The mounting may generally be rigid, with the exception of the relative movement. As a result, the sensor can be held in a defined and positionally precise manner on or, alternatively, inside the vehicle in a collision-free state.

However, in the event of a collision (i.e., in the event of forces acting from outside), by virtue of the relative movability, a defined retreating or rather evasive movement of the sensor inside and/or relative to the vehicle can be made possible. In particular, the sensor may then retreat when viewed in the forward direction of travel or rather be movable counter to this direction. For example, the sensor may be moved towards the vehicle structure or rather the distance therefrom is reduced with respect to the initial position, in which the sensor protrudes from the vehicle structure, for example in the (forward) direction of travel. This movement may take place to the extent that the sensor is brought under the cover of the vehicle structure and/or is positioned further in with respect to a front edge of the vehicle structure (again when viewed in the (forward) direction of travel).

As explained below, a movement along defined axes of movement and/or displacement and/or shifting can take place, in particular on account of specific designs of the sub-assemblies. In particular, a uniaxial relative movement of the sub-assemblies relative to one another and thus of the sensor relative to the vehicle structure can be made possible.

By means of the restoring forces, a movement counter to a collision can take place. This movement may again take place in a straight line and/or uniaxially. Furthermore, the distance from the vehicle structure may be increased, in particular such that the sensor is pushed further in the (forward) direction of travel or rather closer to an outer shell of the vehicle.

The restoring element is for example elastically deformable. In the initial position, it may be undeformed or only slightly deformed and, for example, may experience increasing deformation in proportion to the relative movement, restoring forces being generated in proportion to said deformation. On account of this, even in the case of a restoring element that is undeformed in the initial position, the second sub-assembly can be referred to as being preloaded into the initial position by means of the restoring element (since the undeformed restoring element also more or less immediately generates restoring forces that push said sub-assembly back into the initial position). Optionally, however, it may also be provided that the restoring element then already exerts forces on the second sub-assembly when said restoring element is in the initial position. As a result, a secure hold of the sub-assembly in the initial position is ensured by means of the restoring element, for example in order to prevent an undesired change of position due to vibrations or the like.

In some embodiments, it may also be provided that the second sub-assembly is held in the initial position (e.g., in a form-fitting and/or force-fitting manner) by means of a holding structure (e.g., latching hooks). Said holding structure may, for example, be an engagement structure by means of which the second sub-assembly engages in the first sub-assembly, and/or vice versa. The corresponding engagement may also be produced by means of any other immovable part of the mounting or of the vehicle structure. For example, it may be a latching connection. When a threshold force is exceeded, the corresponding latching connection or rather engagement can be overcome and thus cancelled, and the second sub-assembly can then be moved relative to the first sub-assembly. On account of the restoring forces brought about by this, the second sub-assembly can be forced back into the initial position, where the mechanical engagement or rather latching connection can then for example be restored as well. In this way, too, a secure hold of the second sub-assembly and thus of the sensor in the initial position is achieved. The restoring elements are thus freed from having sole responsibility for applying the forces for holding the second sub-assembly in the initial position.

For example, the first and second sub-assemblies may be shifted linearly relative to one another. In other words, the above-mentioned movability of said sub-assemblies relative to one another may involve a linear shiftability and/or it may be implemented as such. In the case of the linear shiftability, it may be the only possibility for movement relative to one another. In other words, the relative movement of the sub-assembly may generally take place on one axis, along the corresponding linear axis for the relative shiftability. For example, the linear axis for the relative shifting extends in the direction of travel or in a direction of travel and/or along a vehicle longitudinal axis. For example, it may be a horizontal axis. In this way, expected collision forces can be converted into relative movements of the sub-assemblies or rather can be compensated for as a result in a particularly effective manner, in particular when the mounting is located in the region of the front of the vehicle. More precisely, a direction of the possible relative movement may then correspond substantially to a direction of the forces that act in the event of a collision, such that said forces can be effectively evaded, in particular with a limited risk of the sub-assemblies becoming jammed with respect to one another.

In particular, it may be provided that the first sub-assembly comprises a guide portion on or in which the second sub-assembly is movably guided. For example, the second sub-assembly may be received at least in part in the guide portion, receive same or otherwise engage in same at least in portions. By sliding along and/or in the guide portion, the second sub-assembly can then be moved relative to the first sub-assembly. Therefore, an axis for the relative movement, in particular a linear axis of shifting, can be defined by means of the size and/or shape of the guide portion.

Furthermore, in this connection, it may be provided that the guide portion receives a bearing portion of the second sub-assembly and for example surrounds said bearing portion at least in portions on at least three sides. The bearing portion may, for example, be a portion of an outer contour of the second sub-assembly, for example a projection and for example a wedge- or cone-shaped portion as described below. Said portion can be pushed into a correspondingly guided guide portion, which is then for example designed as a correspondingly shaped and/or sized recess. The bearing portion can be shifted in the guide portion, in particular linearly shifted, within the scope of the relative movability. The guide portion may surround and/or adjoin the bearing portion on sides of the bearing portion that extend substantially in parallel with an axis of movement for the relative movement. Viewed along said axis of movement, the bearing portion may also comprise a front and back portion (in this case for example extending transversely to the axis of movement). Optionally, the guide portion may at least also surround said front portion, for example in order to provide a stop contour at this point and/or in order to define an initial position. A corresponding stop contour for interacting with the rear portion (or rear end) of the bearing portion may also be comprised by the mounting and, in particular, by the first sub-assembly. However, it may also be dispensed with, for example if a movement in the corresponding direction out of the initial position is restricted by means of the restoring forces and/or any deformability of the restoring element.

In some embodiments, it is provided that the bearing portion can be shifted relative to the guide portion along an axis of shifting (for example a linear axis of shifting) out of the initial position, wherein a cross-sectional surface of the (stationary) bearing portion increases in size along the axis of shifting at least in portions. The axis of shifting may for example be the single axis for a possible relative movement between the bearing portion and the guide portion and thus between the first and second sub-assemblies. As with all other aspects described herein, the first sub-assembly may generally be stationary (e.g., stationary within the vehicle) and the second sub-assembly may be movably mounted thereon or rather movably guided therein.

It may generally be provided that the bearing portion and guide portion are shaped so as to correspond to one another in order to allow for engagement and/or guidance. In particular, if, for example, the bearing portion is received in the guide portion, the guide portion or rather a recess defined thereby may be shaped so as to correspond to the bearing portion. This may mean that, in the case of the described increase in the size of the cross-sectional surface along the axis of shifting, the cross-sectional surface of the guide portion or rather of a recess defined hereby may decrease in size, and for example to the same extent as the cross-sectional surface of the bearing portion increases in size. In this way, a sufficient guiding effect is ensured during the displacement along the axis of shifting, for example because a clearance between the guide and bearing portions is then limited.

It may generally be provided that the bearing portion is received and/or guided in the guide portion with a clearance in directions transverse to the axis of shifting. However, this is for example limited such that the risk of the bearing portion becoming jammed in the guide portion is minimized and also no significant relative movements in the direction of the clearance are possible. For example, the clearance in all spatial directions may be less than 1 mm and for example less than 0.5 mm.

The increase in size of the cross-sectional surface can be achieved in that the size of the bearing portion changes in at least one dimension that extends transversely to the axis of shifting. For example, this may be a dimension along a first axis that extends orthogonally to the axis of shifting. The axis of shifting and the first axis may be axes of a Cartesian coordinate system or, alternatively, may span such a system. The bearing portion may, additionally or alternatively, also change in size along the third axis in order to achieve the increase in size of the cross-sectional surface.

For example, the cross-sectional surface increases in size continuously and, in particular, linearly along the axis of shifting. The same can also apply to the dimensions along the above-described axes of the bearing portion. A longitudinal axis of the guide and/or bearing portions may generally extend in parallel with the axis of shifting or coincide therewith.

According to some embodiments, the cross-sectional surface of the bearing portion (on which the axis of shifting for example generally stands orthogonally) is oval and/or elliptical at least in portions. The additional axes described above may then extend along the major axis and/or minor axis corresponding to elliptical shapes.

However, it may also be provided that the cross-sectional surface comprises two opposing curved end regions (or edge regions) which may be curved in the shape of a semicircle, for example. A radius of the end regions or rather of the semicircle thereof may increase along the axis of shifting. The end regions may be interconnected via portions that are curved to a lesser extent or that extend in a straight line. In this case, the additional axes mentioned above may be positioned such that axes connect the two opposing curved end regions with one another and/or the opposing regions that are curved to a lesser extent or that extend in a straight line.

The change in size of the cross-sectional surface may generally take place such that the bearing portion becomes larger in at least one direction transverse to the axis of shifting. This may be accompanied by the bearing portion becoming pointed and/or tapering, for example in the direction of the initial position. In particular, this may result in a wedge-shaped structure or rather shape of the bearing portion. If corresponding expansion then occurs around two axes (within the cross-sectional surface) that for example each extend transversely to the axis of shifting, a pyramid-like structure and/or a cross-section of the bearing portion that accordingly expands around multiple axes or on multiple sides can be achieved. Again, the guide portion and, in particular, a recess comprised thereby then taper or, as the case may be, expand accordingly in order to receive the bearing portion. A corresponding dimension of the bearing portion that changes around two axes may result in a shape that can be referred to as a double cone.

In other words, the bearing portion may be movable in a plane that extends (e.g., transversely to the cross-sectional plane). The bearing portion may be wedge-shaped in a plan view of the plane or rather of a cross-section that extends in said plane. In particular, the bearing portion may expand along the axis of displacement and with increasing distance from the initial position. The semicircular end regions explained above may be formed along the outer sides of the cross-section. As already mentioned above, the radius of the corresponding semicircles may become larger when the semicircular end regions are shifted along the axis of displacement and in a direction away from the initial position.

The shifting of the second sub-assembly relative to the first sub-assembly may, as an alternative to the above-described linear axis of shifting, take place on or rather along a circular arc portion. Tangents to said circular arc portion may approximately (e.g., with an angular deviation of less than 30°) correspond at all points to the direction of travel. The geometric relationships in the wedge- or cone-shaped region of the guide portion and bearing portion are, in this case, not defined along a linear axis of shifting, but rather accordingly along the circular arc portion, and therefore extend in a correspondingly curved manner, for example. The radius of the circular arc may be relatively large compared with the dimensions of the guide portion and bearing portion and may generally exceed the dimensions thereof. For example, the radius may be more than 200 mm.

It should generally be noted that the cross-sectional surface described herein is for example orthogonal to the axis of shifting, whereas the cross-section corresponding to the plane of movement may extend in parallel with the axis of shifting or rather contain same.

All shapes or shape changes of the bearing and guide portion described herein can improve the jamming-free movability of said portions relative to one another. In particular, a centering effect can also be produced as a result, such that the second sub-assembly can move in a defined manner relative to the first sub-assembly. In particular, during a return to the initial position, the second sub-assembly can be moved back into the corresponding initial position in a positionally precise manner or rather can be positioned in a defined manner relative to the first sub-assembly and thus within the vehicle.

In summary, it can therefore be provided that the bearing portion tapers at least in portions when viewed in the direction of the initial position (and, e.g., proceeding from an opposing rear portion or rear end) and/or that the bearing portion is designed to be wedge-shaped.

In some embodiments, at least one engagement structure that extends along the axis of shifting is provided between the guide portion and bearing portion. The engagement for example takes place mechanically. It may result in a form fit, e.g., in at least one direction transverse to the axis of shifting. In particular, it may involve engagement of a guide projection (e.g., guide rib) in a guide groove, wherein one of the guide projection and guide groove is formed in the guide portion and/or bearing portion and the other of the guide projection and guide groove is accordingly formed in the corresponding other portion. The guide groove may extend along the axis of shifting, e.g., from a region of the initial position in the guide portion to the desired end position and/or towards the vehicle structure. It can improve the jamming-free guidance of the bearing portion in the guide portion.

The guide projection may also extend along the axis of shifting, e.g., along a majority of or along the entire length of the bearing portion. For example, a plurality of guide projections is provided, e.g., on different sides of the guide portion or bearing portion. For example, a corresponding projection and, for example, an elongate guide rib may be formed on at least three different sides. For example, it is provided that no guiding effect is produced in the initial position and/or there is no contact between the guide projection and guide groove. As a result, redundancies are prevented. However, this guiding effect or rather contact can then be produced during a movement out of the initial position and, for example, as early as after a movement distance of at most 1 mm or at most 10 mm. The guide projection may generally comprise rounded edges and/or radii in order to prevent jamming and thus to facilitate engagement in the guide groove.

Furthermore, it may generally be provided that the guide projection and at least one outwardly facing surface thereof do not follow the above-described cone shape and, in particular, double cone shape of the bearing portion and/or recess of the guide portion. Instead, said guide projection may extend in parallel with the axis of displacement and/or the above-described plane of movement. The guide groove may also be designed in a similar manner, i.e., it may comprise a correspondingly oriented base plane (at the base of the groove). It has been shown that jamming can be reduced as a result, since the contact between the guide groove and guide projection in this case substantially occurs in a plane parallel to the axis of shifting.

According to some embodiments, the restoring element is an (e.g., elongated) extension spring. The restoring element may be fastened by a first end to the first sub-assembly and by a second (opposing) end to the second sub-assembly. Said extension spring can be stretched (i.e., lengthened) depending on the extent of the relative displacement and, in particular, of shifting of the second sub-assembly out of the initial position, for example towards the vehicle structure. This is synonymous with elastic deformation of the extension spring and may be accompanied by corresponding restoring forces. The provision of the extension spring can allow for a compact size for the mounting, for example because the second sub-assembly to be forced back does not have to be supported on additional components of the mounting in order to compress an alternative compression spring or the like.

In particular, at least two extension springs may be provided, which then for example enclose between them the bearing portion of the second sub-assembly and/or are arranged on both sides thereof. For example, said extension springs may receive between them both the guide portion and the bearing portion. In this way, centering and thus jamming-free guidance of the bearing portion in the guide portion can be improved, since the extension springs are stretched substantially in the same manner when the bearing portion is shifted. Undesired moments acting on the bearing portion can therefore be limited.

It may also (alternatively) be provided for a single extension spring to be arranged centrally inside the above-described double cone. The end face of the double cone then for example faces a corresponding aperture for guiding the spring through to its connection point on the first sub-assembly.

The teachings herein also propose a mounting for a vehicle sensor on a vehicle structure, comprising:
a first sub-assembly, which can be fastened to the vehicle structure and which comprises a guide portion;
a second sub-assembly, to which the sensor can be fastened and which comprises a bearing portion that is movably guided on or in the guide portion;
wherein the bearing portion can be shifted out of an initial position relative to the guide portion along an axis of shifting, wherein a cross-sectional surface of the bearing portion increases in size at least in portions along the axis of shifting.

All developments, variants, and embodiments described herein with regard to the above-mentioned features can also be provided for the present embodiments. One difference from the embodiments previously discussed is that, in this variant, restoring forces are not necessarily generated. Instead, this mounting is characterized by a relative movability between the first and second sub-assemblies that is beneficial because it is reliable and free from jamming. This is achieved in that a guide portion and bearing portion of said sub-assemblies cooperate with one another in a defined manner, in particular such that the above-explained shiftability along a defined (linear) axis and/or a general jamming-free movement can be achieved.

This is beneficial in that movements of the mounting and, in particular, of the sensor in the event of collisions can be controlled and/or predicted better. This facilitates a design of the vehicle front for reliably reducing the risk of injury in the event of a collision with a pedestrian or cyclist. Furthermore, the sensor may in this case be designed to provide signals that can still be evaluated even when its position along the defined axis of displacement changes and/or a calibration procedure for recalibrating the sensor after a collision can, due to the position of the sensor having been changed in only one spatial direction (i.e., along one spatial axis), be on a lesser scale than if said sensor can be shifted in any direction as a result of any degree of deformation freedom.

The teachings herein also relate to a vehicle, in particular a passenger car or a truck, comprising an assembly according to any of the embodiments described herein. More generally, it may be a motor vehicle.

In particular, in this connection, it may be provided that the vehicle structure to which the mounting is fastened is a raw component and, in particular, a bumper crossmember and/or that the sensor is a radar sensor. The sensor may generally also be positioned close to a vehicle rear or vehicle side. Any reference made herein to a direction of travel may be synonymous with a direction or replaced with a direction that extends from the sensor in a straight line through the outer shell of the vehicle into the surroundings (i.e., a backwards or sideways direction as well, for example).

Further embodiments of the invention are explained in the following based on the appended schematic FIGS.

Specific references to components, process steps, and other elements are not intended to be limiting. Further, it is understood that like parts bear the same or similar reference numerals when referring to alternate FIGS.

FIG. 1 shows a vehicle 10, comprising a mounting (sensor mounting in the following) 12 according to one exemplary embodiment of the invention. Merely by way of example, the sensor mounting 12 is located in a front region of the vehicle 10. All directional designations in the following relate to forward travel in direction F, as shown in FIG. 1, unless otherwise indicated or unless otherwise obvious. More precisely, the sensor mounting 12 is arranged on a bumper crossmember 16 and, in particular, screwed thereto. As is generally known, the bumper crossmember 16 connects struts of a vehicle bodywork that extend in parallel with one another and, in particular, longitudinal members that extend in parallel with one another.

The sensor mounting 12 serves to position a sensor 18, which is designed herein as an environment detection sensor and, more precisely, a radar sensor for detecting the vehicle environment, as close as possible to the outer layer or outer shell of the vehicle 10. For this purpose, the mounting allows the sensor 18 to be at a distance relative to the bumper crossmember 16, such that the sensor 18 is positioned further forward when viewed in the direction of travel F. The sensor is therefore for example located behind a radiator grille and, in particular, behind an exposed portion of the radiator grille (i.e., behind an opening or hole in the radiator grille). As a result, the sensor 18 can detect the environment without significant interfering contours caused by the vehicle 10. Furthermore, this makes it possible for the opening cross-section to be comparatively small, since the radar radiation emitted from the sensor 18 is emitted in the shape of a cone, i.e., the radiation initially radiates out in a spatial volume with a limited cross-sectional area.

On the other hand, this also means that, in the event of a collision of the vehicle front with the surroundings (e.g., a parking vehicle or a pedestrian), the sensor 18 can immediately form an interfering contour or rather can be significantly influenced by collision forces. As such, the invention provides the movement possibilities explained below for the sensor 18 or rather the mounting 12.

Figure 2:
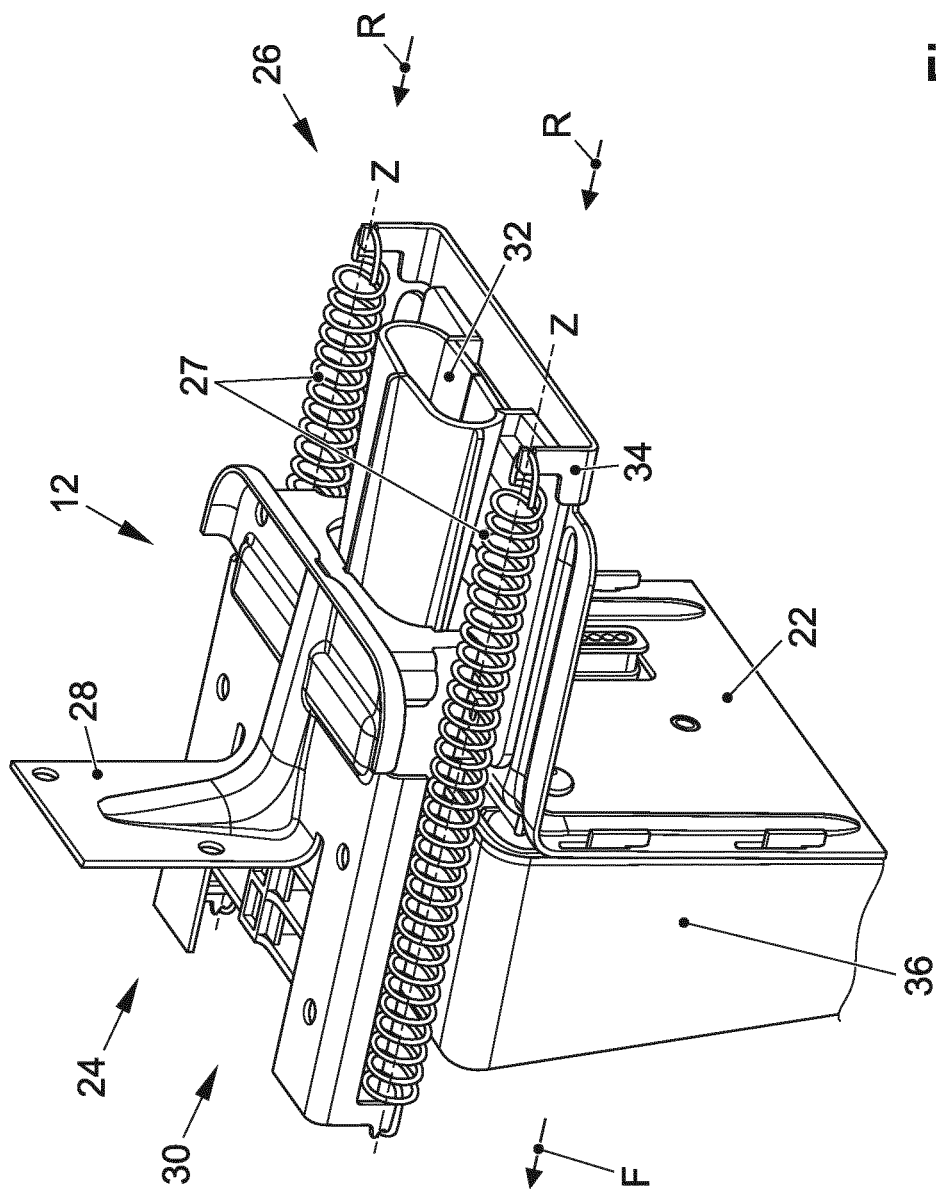
FIG. 2 is a perspective representation of the sensor mounting from FIG. 1 in a detail view.

FIG. 2 shows the sensor mounting 12 together with a receiving region 22 for the sensor 18 (not visible in this FIG.). The connection of the sensor mounting 12 to the vehicle 10 and its positioning within the vehicle can be seen clearly from the views in FIG. 3 and FIG. 6 discussed below.

Going back to FIG. 2, it can be seen that the sensor mounting 12 is generally composed of multiple parts. It comprises a first sub-assembly 24, which is generally stationary relative to the vehicle 10 and is also fastened thereto. A second sub-assembly 26 is movably mounted in said first sub-assembly 24. Both sub-assemblies 24, 26 are formed of multiple parts and are generally manufactured from plastics materials and semi-finished sheet metal parts. Alternatively, a partial or full constructive fusion (or rather a design as common parts) of the respective individual components of the sub-assemblies 24, 26 is also conceivable.

Figure 3:
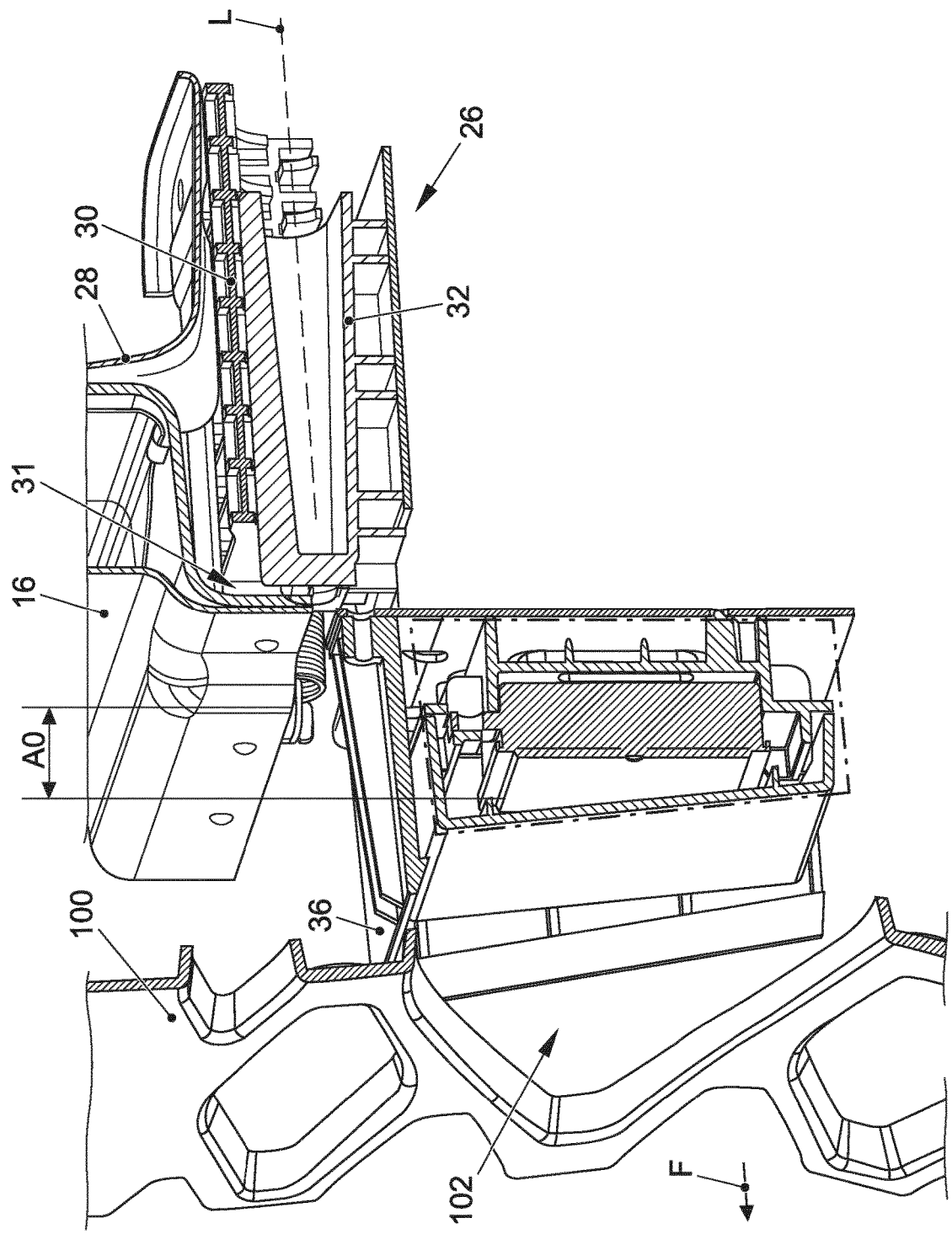
FIG. 3 is a sectional view of the sensor mounting from FIG. 2.
Figure 6:
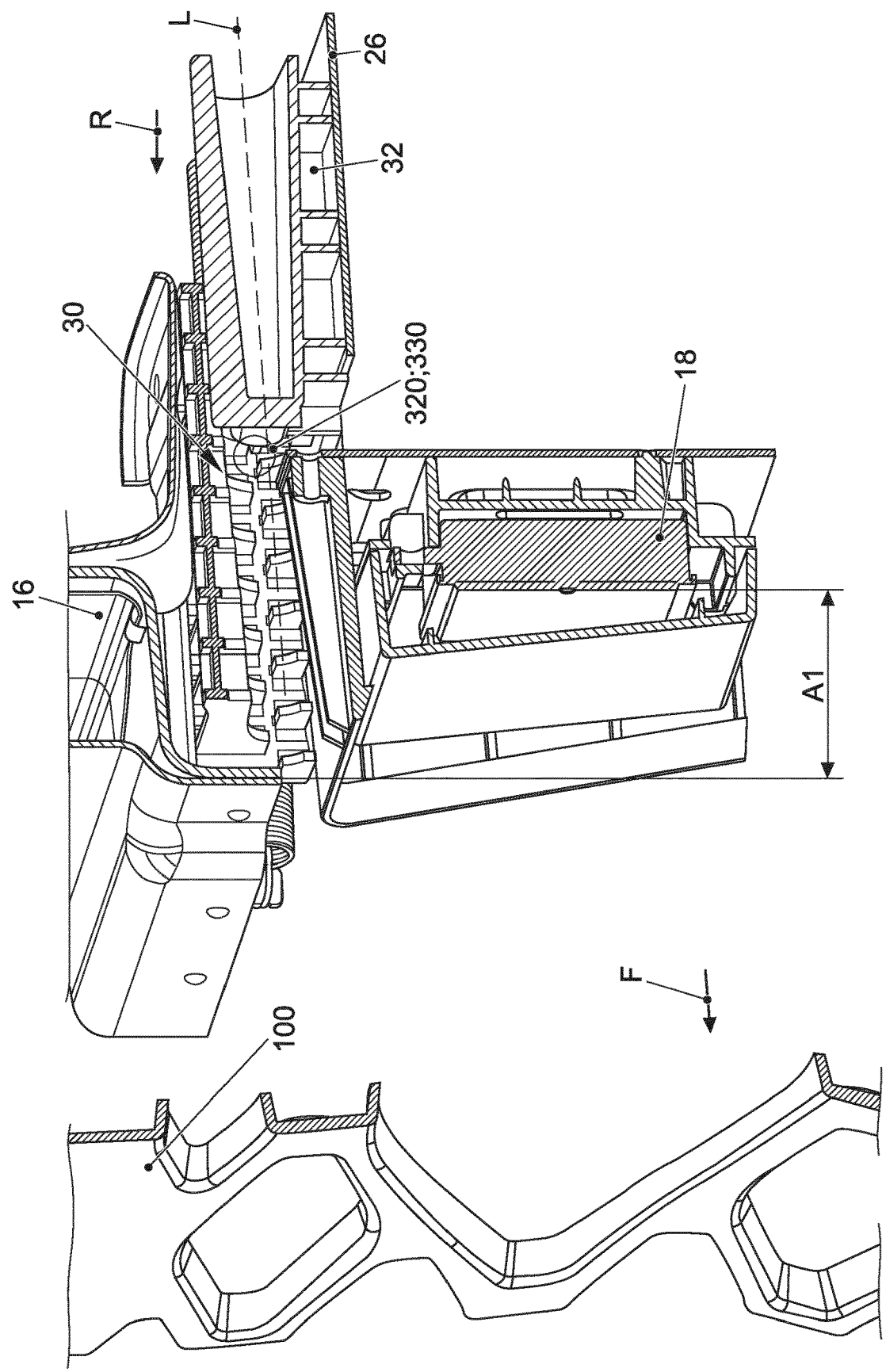
FIG. 6 is a sectional view similar to that in FIG. 3 of the sensor mounting from the previous figures in the event of a collision.

The first sub-assembly 24 comprises a coupling element 28, which can be screwed to the bumper crossmember 16 and/or mechanically fastened thereto in another manner (see following views in FIG. 3 and FIG. 6).

Furthermore, the first sub-assembly 24 also comprises a guide portion 30, which is designed as a separate component from the fastening element 28 by way of example and which, for example, is held thereon by means of a plug-type and/or screw connection.

The second sub-assembly 26 comprises a bearing section 32, which is also designed as a separate component by way of example and which, for example, is fastened to a support component 34 of the second sub-assembly 26 by means of a clamping connection or plug-type and/or screw connection. The receiving region 22 for the sensor 18 is also formed on the support component 34, which is generally designed to be angular, as is an optionally shown shielding element or rather stop frame 36. Said stop frame serves to absorb acting forces, since it forms a region of the second sub-assembly 26 that is furthest forward in the direction of travel F. The sensor 18 is positioned further back relative to said stop frame 36 when viewed in the direction of travel F or rather has retreated towards the bumper crossmember 16 with respect to said stop frame.

The first sub-assembly 24 and the second sub-assembly 26 are interconnected via restoring elements 27 in the form of extension springs. Merely by way of example, two extension springs 27 are provided. Said springs extend along an extension spring longitudinal axis Z, which generally extends in parallel with the linear axis of displacement L explained below based on FIG. 3. The extension springs 27 are formed as a single piece. The extension springs 27 are arranged on both sides of the bearing portion 32 or rather receive same between them. In a displacement along the linear axis of displacement L explained below, the extension springs 27 are therefore stretched substantially to the same extent and thus substantially also generate the restoring forces R that act in the direction of displacement. Said forces act in the direction of travel F and force the second sub-assembly 26 back into its initial position, which is shown in FIG. 3.

The structure and function of the mounting 12 are additionally illustrated in FIG. 3. This FIG. shows the mounting 12 in a state attached to the bumper crossmember 16. As already explained, the coupling element 28 is mechanically fastened to the for example metal bumper crossmember 16, which is designed as a hollow member by way of example. FIG. 3 (but also FIG. 6) shows a cross-sectional view, wherein the cross-sectional plane corresponds to a vertical spatial plane and contains an axis of the direction of travel F. In other words, FIG. 3 is a partial longitudinal sectional view through the vehicle 10.

A radiator grille 100 is shown as an additional vehicle component, which forms an outer shell of the vehicle 10 and also a portion of an external front part of the vehicle 10. The radiator grille 100 can be seen to be provided with openings 102, wherein the sensor mounting 12 and, more precisely, the sensor 18 held thereby is positioned behind one of said openings.

It can first of all be seen that the mounting 12 is positioned in such a way relative to the bumper crossmember 16 that the sensor 18 held hereby has been displaced forwards in the direction of travel F relative to the sensor crossmember 16. In other words, in the initial position shown, which is assumed during normal operation without a collision, there is a distance A0 between the sensor 18 and the bumper crossmember 16. Said distance may, for example, be between 30 mm and 200 mm and, for example, between 50 mm and 100 mm.

In the initial position shown, the bearing portion 32 is received in the guide portion 30 to a maximum extent and, in particular, completely. More precisely, it has retreated therein to a maximum extent or rather is positioned as far forward as possible in the direction of travel F. The position of the bearing portion 32 may be constructively fixed when viewed in the direction of travel F. As a result, the initial position can be defined and further displacement of the bearing portion 32 in the direction of travel F can be prevented. An exemplary constructive feature for achieving this is a stop surface, for example a stationary contact surface of the guide portion 30 for an end face of the edge 323 from the subsequent FIG. 4.

It should be noted that the bearing portion 32 is immovably coupled to the other components of the second sub-assembly 26, i.e., displacement of the bearing portion results in corresponding displacements of the entire second sub-assembly 26 and, in particular, the sensor 18.

The bearing portion 32 is mounted so as to be shiftable within the guide portion 30 along a linear axis of displacement L. In particular, said bearing portion can be displaced to the right viewed counter to the direction of travel F in FIG. 3, i.e., backwards with respect to the bumper crossmember 16. As shown in FIG. 6, this may result in the sensor 18 ultimately being positioned below the bumper crossmember 16 or having retreated slightly further back therefrom. The displacement then occurs when forces act from outside on the second sub-assembly 26 and, in particular, the stop frame 36. As expected, the forces that are present extend substantially parallel to the linear axis of displacement L and counter to the direction of travel F. However, since the above-described possibility of displacement is provided for in this direction, the sensor 18 can evade these forces in a defined manner with a corresponding linear movement without there being an increased risk of the bearing portion 32 jamming in the guide portion 30.

Figure 4:
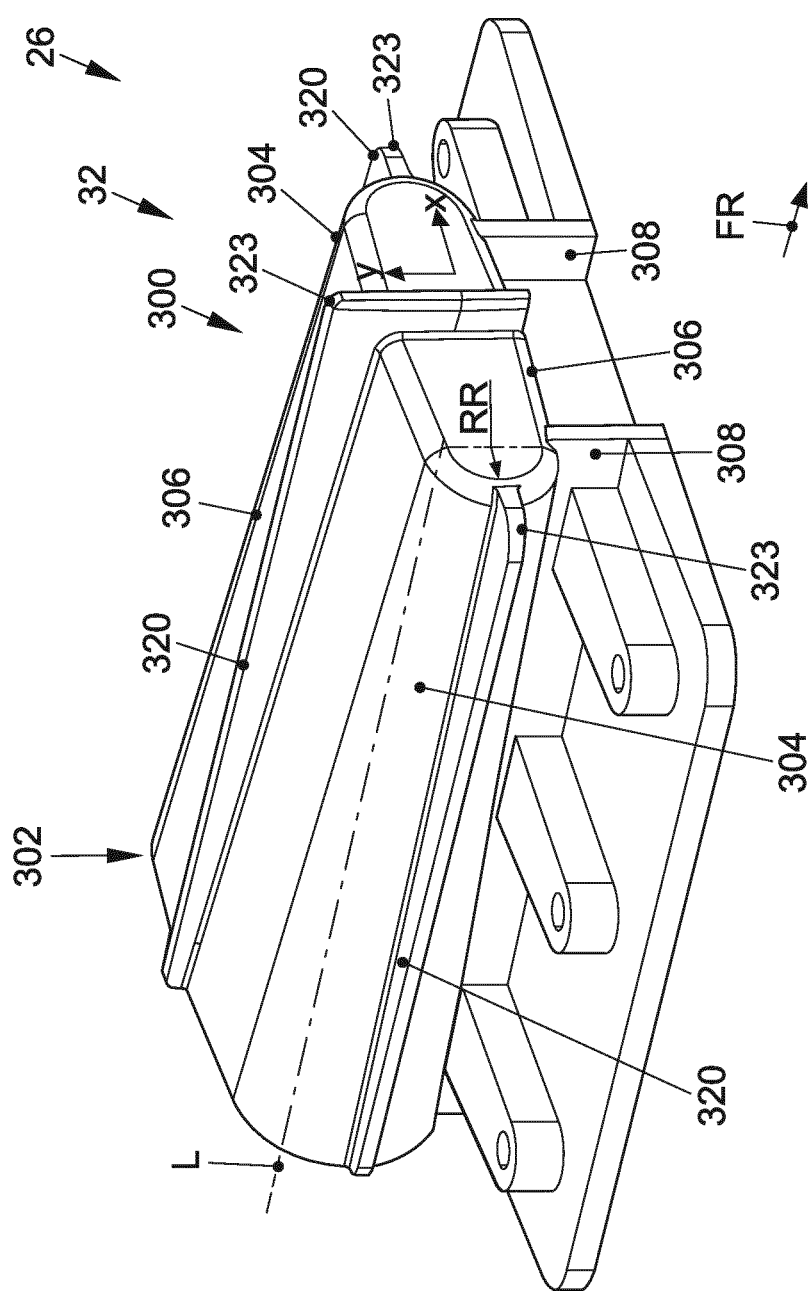
FIG. 4 is a single-component view of a bearing portion of the sensor mounting from the previous FIGS.

FIG. 4 shows the bearing portion 32 of the second sub-assembly 26 in a single-component view. The perspective is mirrored with respect to that in FIG. 3. Consequently, the view is of the front end 300 of the bearing portion 32, which is opposite the stop region 31 of the guide portion 30 and/or adjoins same in FIG. 3. A course of the linear axis of displacement L is also shown. The axis spans a Cartesian coordinate system with two axes X, Y extending orthogonally to the axis of displacement and to one another. By way of example, the axes X, Y form a horizontal spatial plane, wherein the axis Y corresponds to a vertical spatial direction. Furthermore, the axes X, Y form the plane of a cross-sectional surface of the bearing surface 32 which extends orthogonally to the linear axis of displacement L. In contrast, the X and L axis define a plane of movement in which the bearing portion 32 can be displaced.

It can be seen that the cross-sectional surface of the bearing portion 32 increases in size when viewed counter to the direction of travel F (i.e., from the front end 300 to a rear end 302), and in fact increases in size continuously. A cross-sectional surface should be understood to mean a surface enclosed by the outer contours, even if the bearing portion 32 may be designed to be hollow. Said hollow region may therefore also contribute to the cross-sectional surface. The cross-sectional expansion takes place in the example shown in that dimensions along both axes X, Y increase towards the end 302. More precisely, the bearing portion 32 increasingly expands along both axes. Consequently, in each case, it has two mutually opposing side regions which converge or, more precisely, meet so as to form a point in the direction of the front end 300. These side regions are the rounded outer edges 304 (or outer end regions), which extend substantially along the linear axis of movement L, as well as the mutually opposing outer surfaces 306, which are larger in size and extend substantially in a straight line. Said outer surfaces connect the rounded edge regions 304 to one another and have larger surface areas. Since there are two side regions that converge or rather taper in pairs, the shape of the bearing portion 32 can be referred to as a sort of double cone and/or pyramid. Angular portions 308 which allow for connection of the bearing portion 32 to the support element 34 from FIG. 2 are shown merely by way of example.

The shape of the bearing portion 32 may also be described as follows: Both of the end regions 304 in each case define semicircles in the above-described cross-sectional surface. The radius of said end regions increases continuously along the axis of shifting L towards the rear end 302 of the bearing portion 32. An exemplary radius RR is shown in FIG. 4 for the left-hand edge region 304. Furthermore, the shape of the bearing portion 32 is determined in that the end regions 304 extend at an angle to one another in the above-described plane of movement. In other words, the bearing portion 32 is wedge-shaped in the corresponding plan view. This wedge shape, together with the increase in the radius RR, which continuously increases the dimension in Y, for example, results in a double cone shape of the bearing portion 32.

As another feature of the bearing portion 32, a plurality of guide projections in the form of guide ribs 320 can be seen. These are positioned on three different sides, namely on the edge regions 304 and on the upwardly or rather outwardly facing outer surface 306. An outermost edge of these guide ribs 320 extends in a straight line and in parallel with the axis of shifting L. It therefore does not follow the outer contour of the bearing portion 32 and does not form the double cone shape thereof. On the front end of the bearing portion 32 facing the viewer, the guide ribs 320 each comprise edges provided with radii or rather rounded edges 321. The guide ribs 320 generally extend along the axis of shifting L and are formed in a straight line.

Figure 5:
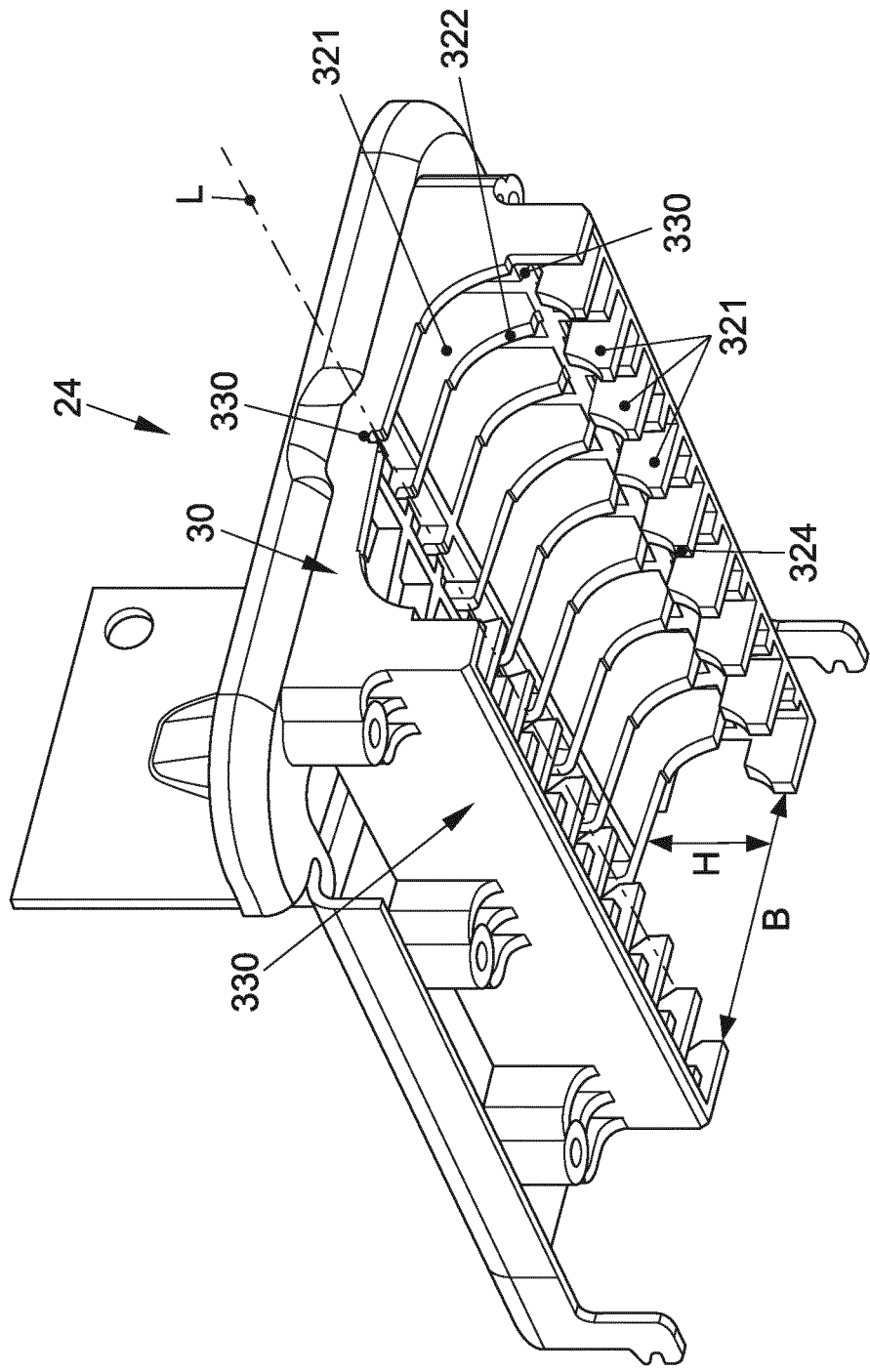
FIG. 5 is a single-component view of a guide portion of the sensor mounting from the previous FIGS.

FIG. 5 shows a view of the first sub-assembly 24 and, more precisely, of an underside of the guide portion 30. The guide portion generally defines a recess or rather receiving region in which the bearing portion 32 can be received and, in particular, is mounted so as to be shiftable. Merely by way of example, said receiving region is delimited by multiple individual ribs 321, of which only some are provided with a corresponding reference sign. Some of the ribs 321 have an upper radius 322, which upwardly delimits a position of the bearing portion 32 in the vertical direction. Other ribs 321 have a lower radius 324, which downwardly delimits a vertical position of the bearing portion 32. As a result, functional separation is made possible and the risk of a double fit is reduced.

Guide grooves 330 are also shown. These extend along the axis of shifting L as well as through the individual ribs 321. The guide grooves 330 therefore define aligned cut-outs in the ribs 321. The guide grooves 330 are generally designed to receive the guide ribs 320 of the bearing portion 32 in order to guide them during shifting along the axis of shifting L. The guide ribs 320 and the guide grooves 330 thus form an engagement structure between the first and second sub-assemblies 24, 26. As shown in FIG. 5, it is clear that the guide grooves are arranged at positions corresponding to the guide ribs 320, wherein one of the guide grooves 330 is not visible in FIG. 5.

Respectively opposing portions of one or of adjacent ribs 321 define the displayed width B and height H of the receiving region 30. The width B and height H extend along the X and Y axis, respectively, in FIG. 4 (the width B along the X-axis and the height H along the Y-axis). A cross-sectional surface of the recess defined by the guide portion 30 expands continuously when viewed along the linear axis of shifting L (and counter to the direction of travel F) in a similar manner to the cross-sectional surface of the bearing portion 32. This takes place by means of a corresponding enlargement of the width and height dimension B, H (see corresponding variable positioning of the radii 322, 324 along the axis of shifting L). When the bearing portion is shifted along the axis L and counter to the direction of travel F, lateral linear guidance takes place as a result, which is additionally improved by the optional engagement structure shown.

In the case of a reverse displacement back into the initial position (i.e., in the direction of travel F), the ever smaller cross-sectional surfaces of the recess 30 and bearing portion 32 cooperate so as to produce a centering effect, such that the sensor 18 is once again positioned in a defined manner relative to the crossmember 16 and/or generally in the vehicle 10. The sensor does not then need to be recalibrated in spite of the at least temporary change of position, or the calibration effort is reduced at least considerably.

A corresponding state in which the sensor 18 has been forced out of its initial position according to FIG. 3 is shown in FIG. 6. It can be seen that the bearing portion 32 has been pushed out to a large extent and, in fact, more than halfway out of the guide portion 30 and has been shifted to a considerable extent relative to the stop region 31. A distance between the sensor 18 and the bumper crossmember 16 and, more precisely, a front edge thereof has reduced considerably and has even assumed a negative sign (see corresponding distance A1). On account of the interaction between the guide portion 30 and bearing portion 32, the displacement movement takes place along a defined linear axis of displacement, namely the axis L. The guiding is facilitated by the engagement structure 320, 330, which is highlighted with an outline. Since the restoring elements 27 from FIG. 2 have also been elastically deformed in the process, a restoring movement into the initial position from FIG. 3 can be achieved immediately by means of the corresponding restoring forces R of the second sub-assembly 26 when the forces acting from outside abate.

Therefore, defined evasion is possible in the event of a collision, which reduces the risk of damage to the sensor 18 and also the risk of injury to collision partners. However, after the collision has ended, an automatic, positionally precise return to a desired initial position is possible, such that the sensor 18 can then be operated again, potentially without any maintenance or repair work being required.

As already mentioned in the general part of the description, benefits can also be achieved if the sensor 18 can be displaced along for example a single linear axis of displacement L without restoring forces R being generated. In the present example, this displacement takes place on account of the described shapes and dimensions and the associated cooperation between the guide portion 30 and bearing portion 32.

Figure 7:
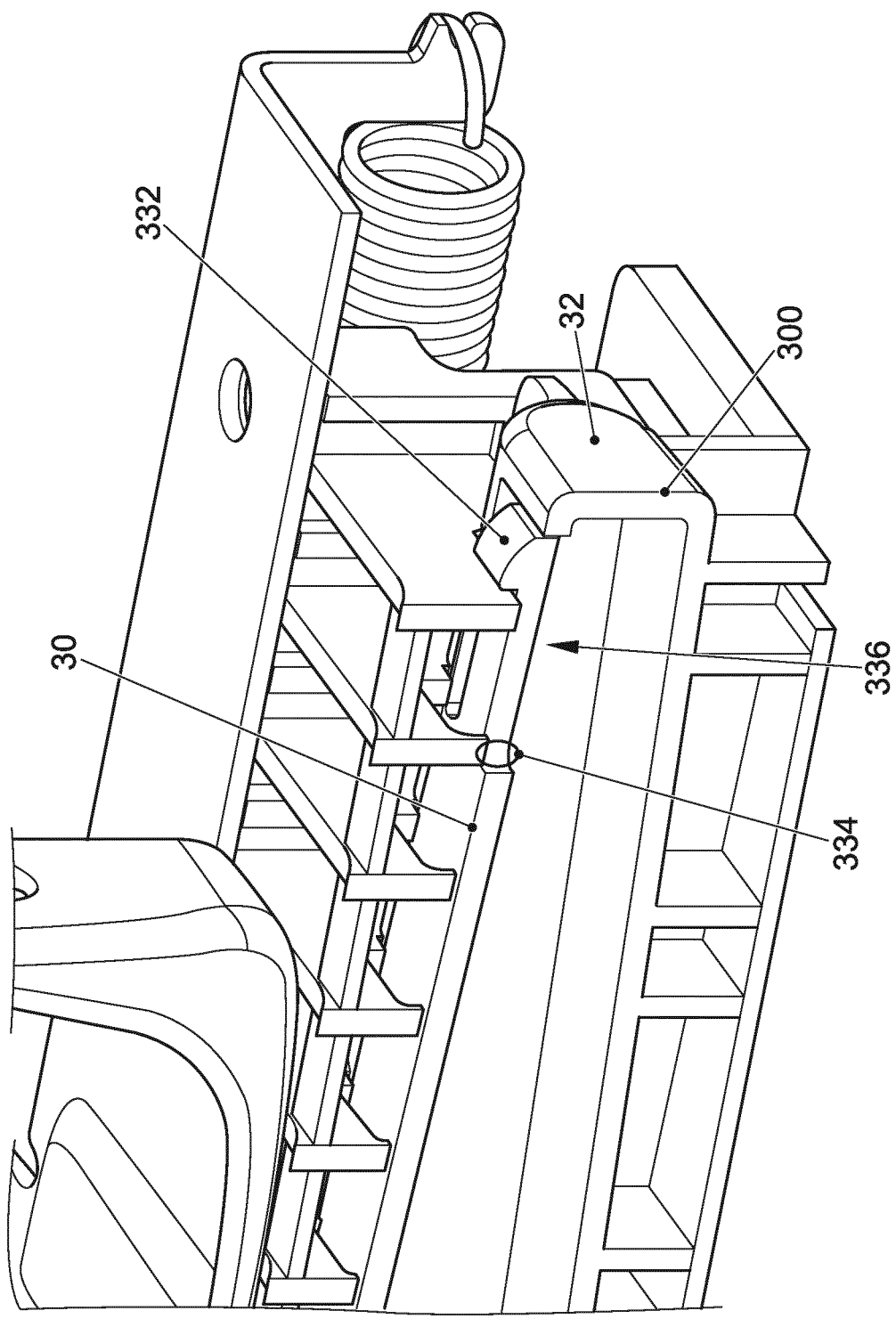
FIG. 7 is a sectional detail view of a sensor mounting according to another embodiment.

FIG. 7 shows a sectional detail view of a mounting 12 according to another exemplary embodiment. The sectional plane corresponds to that from FIG. 3, for example, but the viewing direction is reversed and is directed towards the front end 300 of the bearing portion 32.

As an extension to the previous exemplary embodiments, in this variant, it is provided that the bearing portion 32 and the guide portion 30 are held on one another in the initial position shown by means of an engagement structure comprising at least one latching hook 332. The latching hook 332 is connected to the bearing portion 30 via a joint 334 (in the case shown a solid joint). Said latching hook can deflect into a cavity 336 in the interior of the bearing portion 32 when it is released from the guide portion 30.

This allows for a secure hold that is as vibration-free as possible and thus a correspondingly reliable positioning of the sensor in the initial position. Furthermore, the risk of unnecessary displacements of the sensor 18 is reduced (e.g., in the absence of an actual collision), since, on account of the form-fitting latching connection, an increased limit force must first be overcome in an abrupt manner in order to displace the sensor 18.

FIG. 8 shows the sub-assembly 26 in an embodiment that differs from the previous representations, wherein the stop frame 36 is an integral or fitted component of the radiator grille 100. The viewing direction corresponds to a view obliquely from behind onto the radiator grille 100 in the direction of travel F. The stop frame 36 for example engages in the support component 34 of the sub-assembly 26 via guide pins 400 in recesses in the form of slots 402. In the process, compensation for tolerances for example takes place in all axial directions on account of the lateral and vertical distance between the guide pins 400 on the stop frame 36 and the flanks of the slots 402 in the support part 34 as well as on account of the distance between the rear edge 404 of the stop frame 36 and the support part 34.

In all exemplary embodiments (but also independently hereof as a general aspect of the invention), a cleaning apparatus may be provided for generating a fluid jet directed at the sensor 18. As a result, dirt can be removed from the sensor surface. The fluid jet may, for example, be an air or liquid jet.

LIST OF REFERENCE NUMERALS

10 Vehicle
12 (Sensor) mounting
16 Bumper crossmember
18 Sensor
22 Receiving region
24 First sub-assembly
26 Second sub-assembly
27 Restoring element
28 Coupling element
30 Guide portion
31 Stop region
32 Bearing portion
34 Support component
36 Stop frame
100 Radiator grille
102 Opening
300 Front end
302 Rear end
304 Curved edge regions
306 Opposing surfaces
308 Angular portion
320 Guide rib
321 Rib
322 Upper radius
323 Edge
324 Lower radius
330 Guide groove
332 Latching hook
334 Joint
400 Guide pin
402 Slot
404 Rear edge
A0, A1 Distance
L Linear axis of displacement
B Width
H Height
F (Forward) direction of travel The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A mounting for a sensor on a vehicle structure, comprising:
 a first sub-assembly, which can be fastened to the vehicle structure;
 a second sub-assembly, to which the sensor can be fastened; and
 at least one restoring element; wherein
  the first and second sub-assemblies are movable relative to one another during operation of the vehicle and the restoring element is configured to exert restoring forces on the second sub-assembly in accordance with the relative movement, in order to move the second sub-assembly into an initial position,
  the first and second sub-assemblies can be shifted linearly relative to one another;
  the first sub-assembly comprises a guide portion on or in which the second sub-assembly is movably guided;
  the guide portion receive a bearing portion of the second sub-assembly, and wherein
  the bearing portion can be shifted relative to the guide portion along an axis of shifting out of the initial position, wherein a cross-sectional surface of at least a portion of the bearing portion tapers in size towards the direction of the initial direction along the axis of shifting to provide positional accuracy when the initial position is assumed.

2. The mounting of claim 1, wherein the bearing portion tapers in two directions as a double cone.

3. The mounting of claim 1, comprising at least one engagement structure that extends along the axis of shifting between the guide portion and bearing portion.

4. The mounting of claim 1, wherein the restoring element is an extension spring.

5. The mounting of claim 1, wherein the guide portion receives a bearing portion of the second sub-assembly and surrounds said bearing portion at least in portions on at least three sides.

6. A vehicle, comprising the mounting of claim 1.

7. The vehicle of claim 6, wherein the vehicle structure is a bumper crossmember.

8. The vehicle of claim 6, wherein the sensor is a radar sensor.

9. The mounting of claim 1, wherein bearing portion is designed to be wedge-shaped.

10. A mounting for a sensor on a vehicle structure, comprising:
 a first sub-assembly, which can be fastened to the vehicle structure and which comprises a guide portion;
 a second sub-assembly, to which the sensor can be fastened and which comprises a bearing portion that is movably guided on or in the guide portion;
 wherein the bearing portion can be shifted out of an initial position relative to the guide portion along an axis of shifting during operation of the vehicle, wherein a cross-sectional surface of the bearing portion comprises a taper towards the direction of the initial position, changing in size at least in portions along the axis of shifting, so that when the bearing portion is shifted back to the initial position, the taper causes a centering of the second sub-assembly in the guide portion, so that the taper causes the sensor to be precisely positioned with respect to the first sub-assembly when in the initial position.

11. A vehicle, comprising the mounting of claim 10.

12. The vehicle of claim 11, wherein the vehicle structure is a bumper crossmember.

13. The vehicle of claim 11, wherein the sensor is a radar sensor.

14. The mounting of claim 10, wherein the bearing portion tapers in two directions as a double cone.

15. The mounting of claim 10, wherein the bearing portion is designed to be wedge-shaped.

16. The mounting of claim 10, comprising at least one engagement structure that extends along the aXis of shifting between the guide portion and bearing portion.

17. The mounting of claim 10, wherein a restoring element is present that is an extension spring.

18. The mounting of claim 10, wherein the guide portion receives a bearing portion of the second sub-assembly and surrounds said bearing portion at least in portions on at least three sides.

* * * * *